United States Patent [19]
Saunders et al.

[11] Patent Number: 5,223,010
[45] Date of Patent: Jun. 29, 1993

[54] BAG TENSIONER DEVICE

[75] Inventors: Craig M. Saunders, Rocky River; Terry L. Zahuranec, Hudson; Dennis A. Rogers, Madison, all of Ohio

[73] Assignee: Royal Appliance Mfg. Co., Cleveland, Ohio

[21] Appl. No.: 934,418

[22] Filed: Aug. 24, 1992

[51] Int. Cl.[5] ............................................. B01D 46/02
[52] U.S. Cl. ............................................. 55/357; 15/351; 55/374; 55/378; 55/DIG. 2
[58] Field of Search .................... 15/351; 55/357, 369, 55/374, 378, DIG. 2, DIG. 3

[56] References Cited
U.S. PATENT DOCUMENTS

| | | |
|---|---|---|
| 1,894,343 | 1/1933 | Butzer . |
| 2,045,496 | 6/1936 | Skinner . |
| 3,032,799 | 5/1962 | Smith . |
| 4,311,483 | 1/1982 | Schaefer et al. . |
| 4,349,361 | 9/1982 | Scott et al. . |
| 4,405,346 | 9/1983 | Tshudy et al. . |
| 4,566,884 | 1/1986 | Jones et al. . |
| 4,621,390 | 11/1986 | Hampton et al. . |
| 4,662,913 | 5/1987 | Vermillion . |
| 4,936,883 | 6/1990 | Larsson et al. . |
| 5,007,133 | 4/1991 | Lackner et al. . |

Primary Examiner—Charles Hart
Attorney, Agent, or Firm—Fay, Sharpe, Beall, Fagan, Minnich & McKee

[57] ABSTRACT

A bag securing and tensioning system for a vacuum cleaner includes a duct for directing a flow of dirt-laden air from an inlet thereof to an outlet thereof, a porous outer bag and a connection member for releasably mounting the outer bag to the outlet end of the duct. The connection member includes a longitudinally extending slot located in a handle of the vacuum cleaner and a bag guide member including an extension slidably mounted in the slot. A bag clip is secured to the bag guide member. The bag clip holds an end of the porous outer bag.

20 Claims, 4 Drawing Sheets

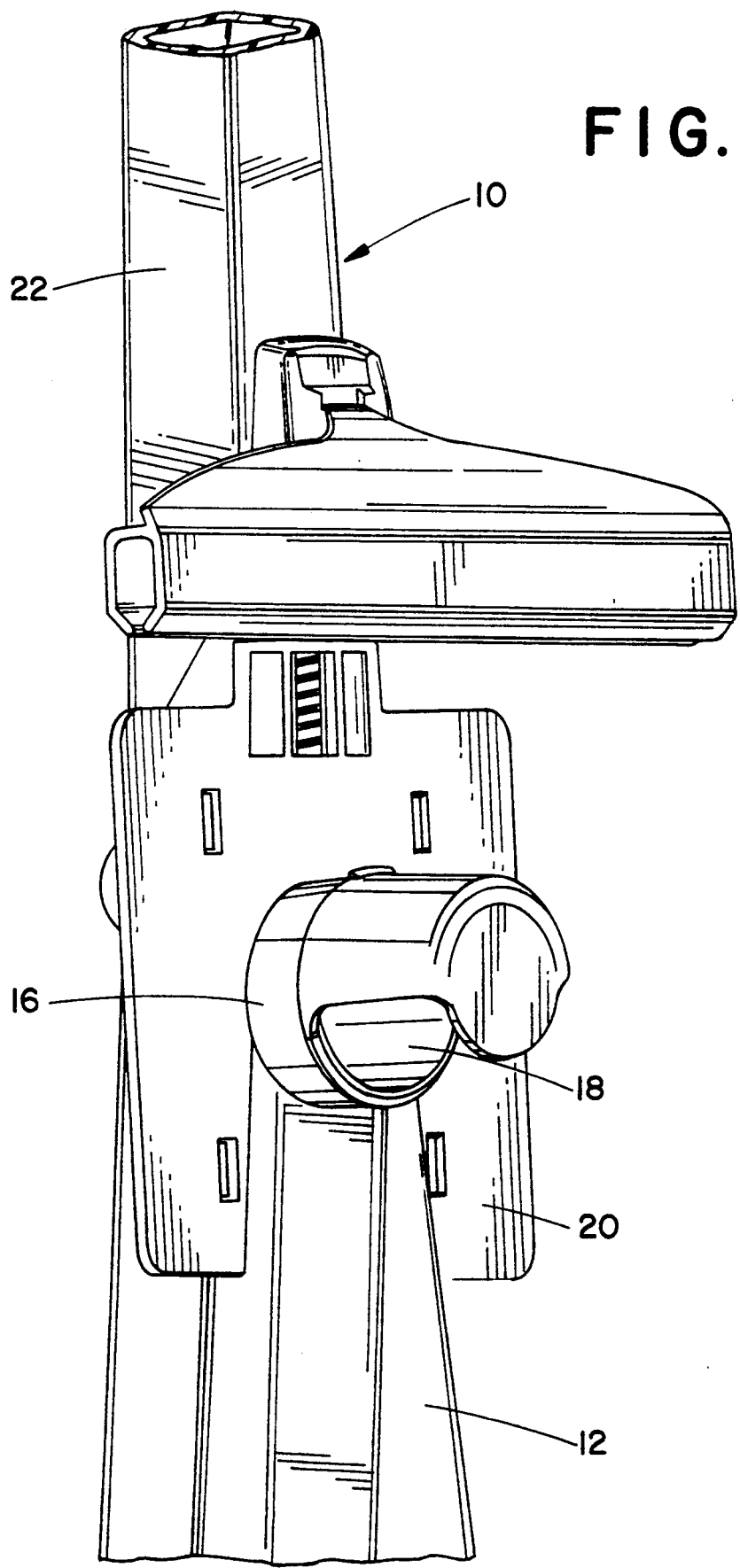

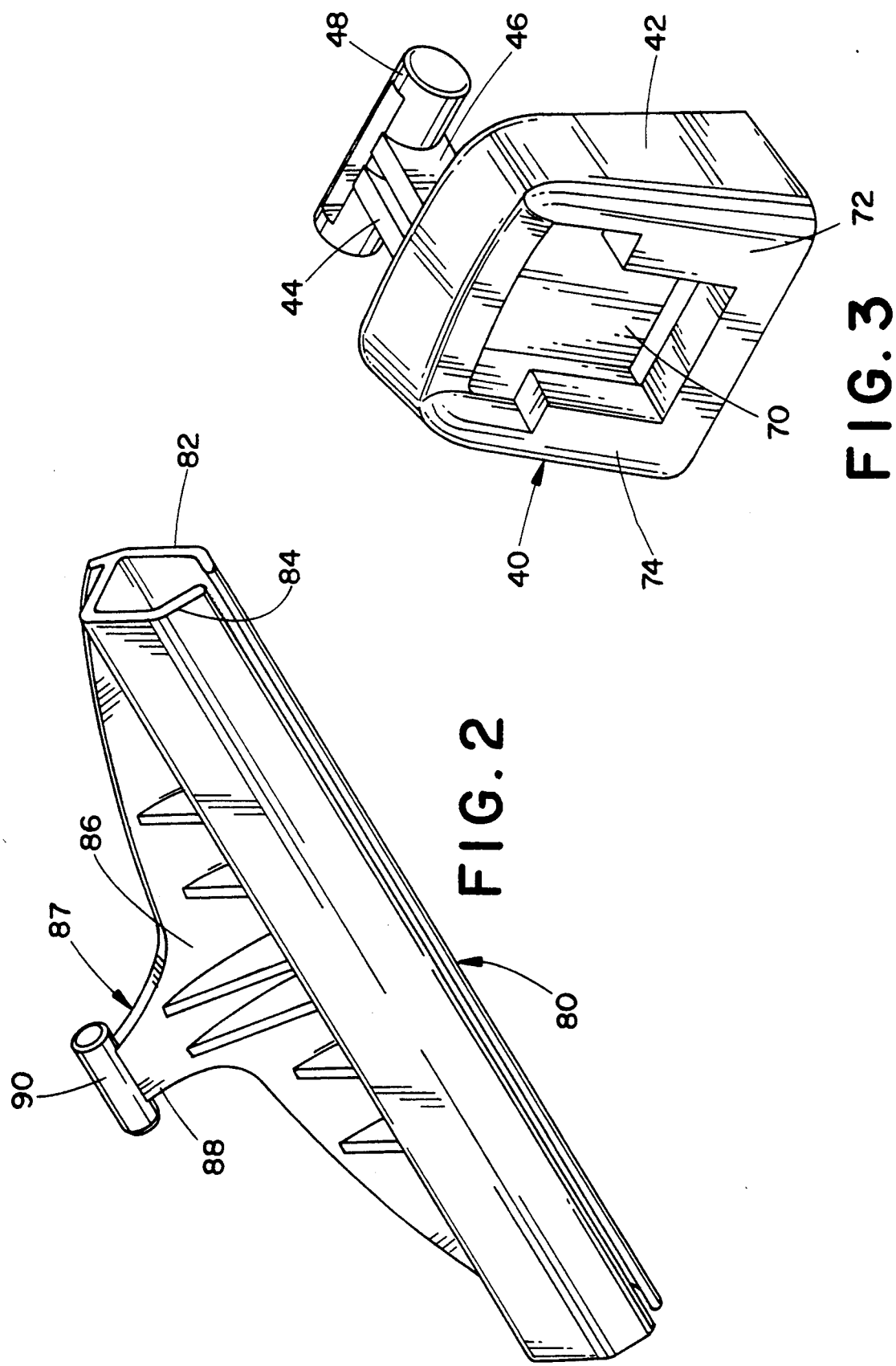

BAG TENSIONER DEVICE

BACKGROUND OF THE INVENTION

This invention relates generally to electric vacuum cleaners. More particularly, the present invention is directed to an improved bag securing and tensioning system for such a vacuum cleaner.

The present invention is specifically directed to the provision of a bag securing and tensioning system for an upright vacuum cleaner, i.e. a vacuum cleaner of the type that has a floor engaging base unit with wheels, a generally vertically extending handle pivotally mounted on the base unit and a bag preferably held by the handle for collecting dirt.

It is known to suspend a fabric dirt collecting bag from the handle of an upright vacuum cleaner by a connection element such as a coil spring which is mounted in an exposed location on the exterior of the cleaner. However, such exposed coil springs detract from the appearance of the cleaner and are prone to damage. In addition, exposed coil springs are prone to become entangled with household objects, such as tablecloths, drapes, electric cords or the like with the consequent likelihood of injury not only to the household objects but, as mentioned, to the coil spring itself. Similarly, it is known to provide other connection elements such as extendable cords or the like which are also exposed on the exterior of the handle of the cleaner.

There is known a resilient bag suspension arrangement for an upright vacuum cleaner's handle in which a coil spring provides resiliency to the bag support. Much of the bag supporting structure is arranged within the fabric bag of the vacuum cleaner and enclosed with a recessed cover. However, this construction is disadvantageous because of its bulky size. This construction is also relatively expensive. It is also known to provide a resilient suspension system in the form of a strip of synthetic rubber that is secured at one end to a handle of the vacuum cleaner and, at the other end, to a cross brace member that holds an upper end of the vacuum cleaner cloth bag. However, such bag suspension systems are not easy to remove when that is considered necessary as a cover plate held on by fasteners first needs to be removed in order to allow access to the resilient material strip.

Also known is an upright vacuum cleaner having a bag retainer made of a flexible plastic material. One end of the bag retainer is secured to the upper end of a cloth bag with the other end of the bag retainer being affixed to the lower end of a coil spring mounted in the hollow handle of the vacuum cleaner. This arrangement, however, is subject to its own disadvantages.

Accordingly, it has been considered desirable to develop a new and improved bag support system for upright vacuum cleaners which would overcome the foregoing difficulties and others while providing better and more advantageous overall results.

BRIEF SUMMARY OF THE INVENTION

According to one aspect of the invention, a bag securing and tensioning system is provided for a vacuum cleaner. The system comprises a duct means for directing a flow of dirt laden air from an inlet end thereof to an outlet end thereof, a porous outer bag and a connection means for releasably mounting the outer bag to the outlet end of the duct means. The connection means comprises a longitudinally extending slot located in a handle of the vacuum cleaner, a bag tensioner member including an extension slidably mounted in the slot and a bag clip secured to the bag tensioner member, the bag clip holding an end of the porous outer bag.

Preferably, the connection means comprises a means for biasing the bag guide member that is slidably mounted in the slot in one direction in relation to the duct means inlet end. In the preferred embodiment, the means for biasing comprises a spring located in the slot below the extension of the bag guide.

In the preferred embodiment, the bag clip comprises a T-shaped extension mounted in a slot extending longitudinally in the bag tensioner member and a pair of jaws which hold the upper end of the porous outer bag.

According to another aspect of the present invention, a vacuum cleaner is provided. The vacuum cleaner comprises a floor engaging unit and a handle assembly pivotally connected to the floor engaging unit. The handle assembly includes a duct through which dirt laden air is conducted. A vacuum pump means is located in one of the floor engaging unit and the handle assembly for urging dirt laden air through the duct. A porous filter bag is mounted by a connection means to an outlet end of the duct. A porous outer bag encloses the filter bag. A lower bag support member is secured to the handle assembly for holding a lower end of the outer bag. An upper bag support assembly is provided for holding an upper end of the outer bag. The upper bag support assembly comprises a longitudinally extending slot located in the handle of the vacuum cleaner, a bag guide member including an extension slidably mounted in the slot and a bag clip secured to the bag guide member, the bag clip holding an end of the porous outer bag.

One advantage of the present invention is the provision of a new and improved bag support system for a vacuum cleaner, such as an upright vacuum cleaner.

Another advantage of the present invention is the provision of a bag securing and tensioning system which conceals the means for tensioning and protects it from damage.

Still another advantage of the present invention is the provision of a bag securing and tensioning system which provides a very simple, reliable and easily releasable connection for connecting the end of the bag to the support.

Yet another advantage of the present invention is the provision of a bag securing and tensioning system which includes a bag guide member and a separate bag clip member such that the two can be disconnected from each other as desired.

A further advantage of the bag securing and tensioning system according to the present invention is the provision of a bag guide member which is slidably mounted in a slot provided in the handle of the vacuum cleaner.

A still further advantage of the bag securing and tensioning system according to the present invention is the provision of a sturdy and damage-proof structure which is capable of withstanding everyday stresses without suffering damage.

A yet further advantage of the present invention is the provision of a bag securing and tensioning system in which a bag clip member can be disconnected from a bag guide member so as to allow the removal and replacement of an inner filter bag upon the opening of the outer bag. Thereafter, once a new filter bag is secured in place, the outer bag clip member can be easily connected again to the bag guide member.

Still other advantages and benefits of the present invention will become apparent to those skilled in the art upon a reading and understanding of the following detailed specification.

BRIEF DESCRIPTION OF THE DRAWINGS

The invention may take physical form in certain parts and arrangements of parts a preferred embodiment of which will be described in detail in this specification and illustrated in the accompanying drawings which form a part hereof and wherein:

FIG. 1 is a perspective view of a portion of a vacuum cleaner handle illustrating the bag securing and tensioning system according to the preferred embodiment of the present invention;

FIG. 2 is a perspective view of a bag clip member of the system of FIG. 1;

FIG. 3 is a perspective view of a bag guide member of the system of FIG. 1;

DETAILED DESCRIPTION OF THE PREFERRED EMBODIMENT

Figure 4:
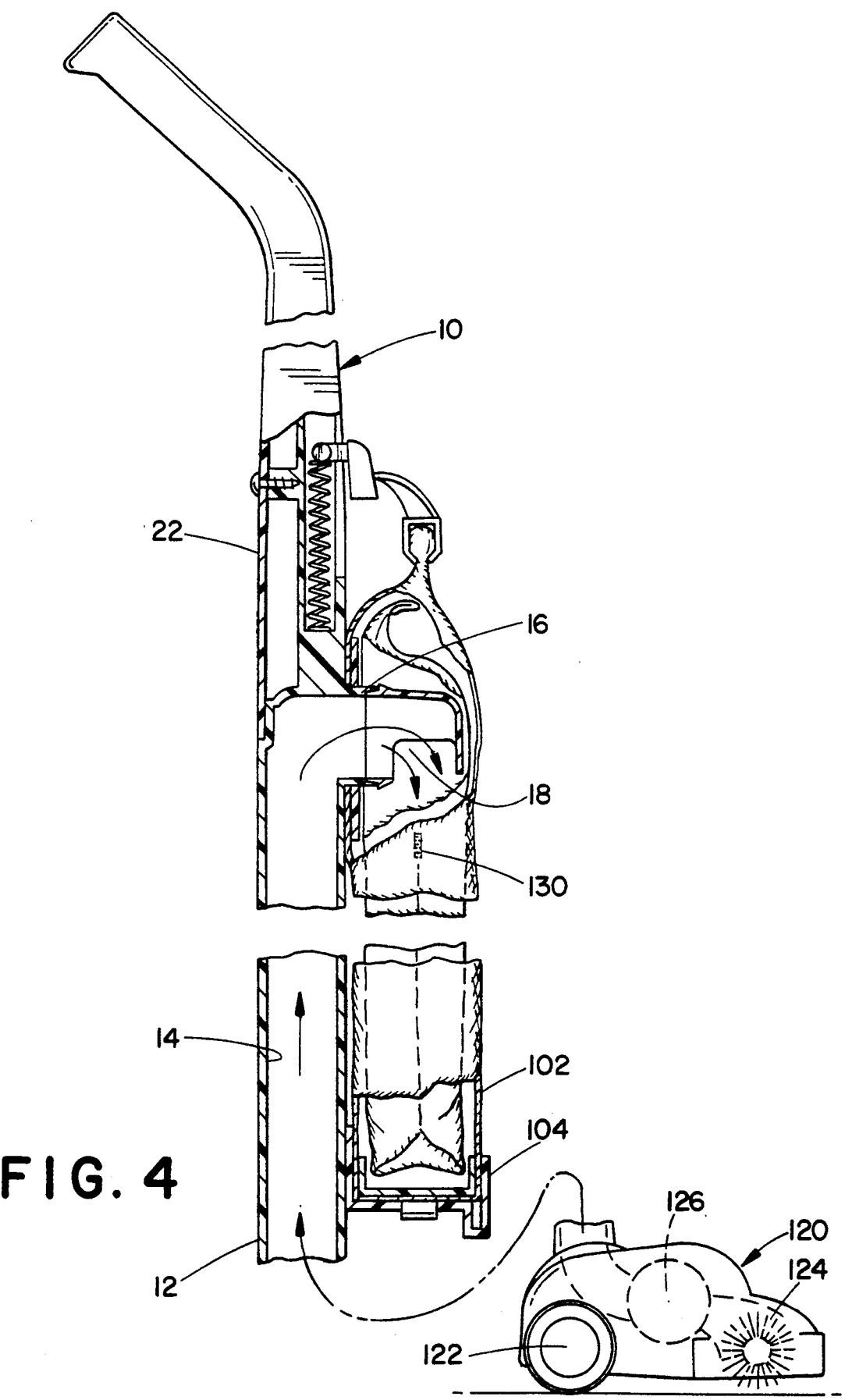
FIG. 4 is a reduced partial cross-sectional view of the system of FIG. 1 together with an inner filter bag and an outer bag.

Referring now to the drawings wherein the showings are for purposes of illustrating a preferred embodiment of the invention only and not for purposes of limiting same, FIG. 4 shows a vacuum cleaner having a bag securing and tensioning system. While the securing and tensioning system is illustrated as being used on an upright vacuum cleaner, it is evident that this system could also be adapted for use for other types of cleaning devices.

With reference now to FIG. 1, the vacuum cleaner includes a handle 10 having a lower tubular portion 12. A duct 14 (FIG. 4) extends through the lower tubular portion. The duct includes an inlet end (not shown) and an outlet end 16 provided at a bend in the tubular portion. The outlet end terminates in a port 18. A plate 20 is secured to the lower tubular portion 12 around the port 18. As shown in FIG. 4, the handle 10 also includes an upper tubular portion 22 which extends above the duct.

Figure 5:
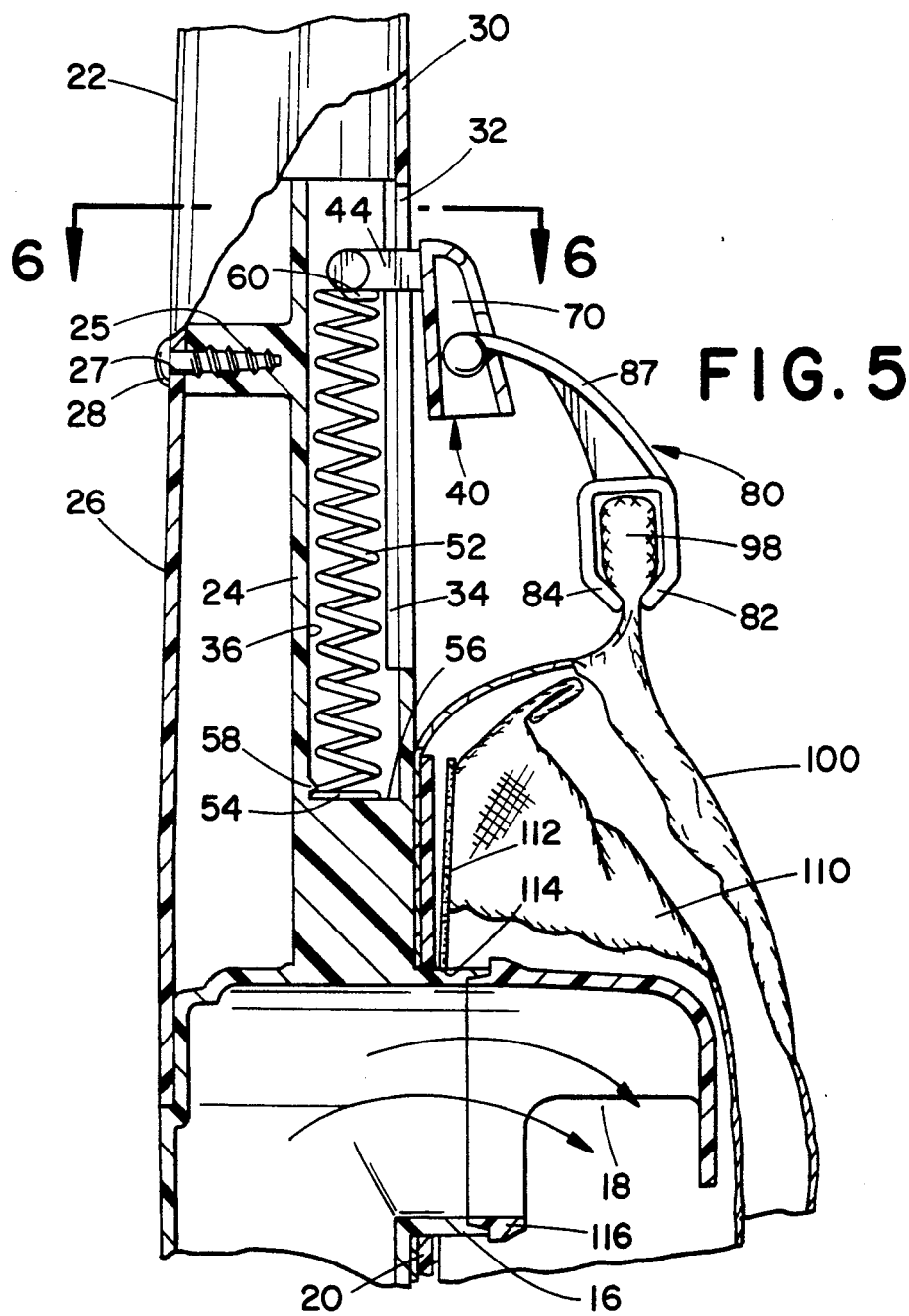
FIG. 5 is an enlarged partial cross-sectional view of a portion of FIG. 4.

With reference now to FIG. 5, the upper tubular portion 22 is hollow and has disposed therein a housing 24. The housing includes a stem 25 which extends rearwardly so as to contact a rear face 26 of the upper tubular portion 22. A suitable aperture 27 extends through the tubular portion rear face so as to allow a fastener 28 to secure the stem 26 to the tubular portion 22.

The upper tubular portion 22 is also provided with a front wall 30 in which extends a longitudinally oriented slot 32. Similarly, a longitudinally oriented slot 34 extends in a front wall of the housing 24. The two slots are substantially coextensive and aligned. The housing slot 34 communicates with a longitudinally extending cavity 36 located in the housing. A guide 40 is adapted to extend through the slots 32 and 34 into the housing cavity 36.

Figure 6:
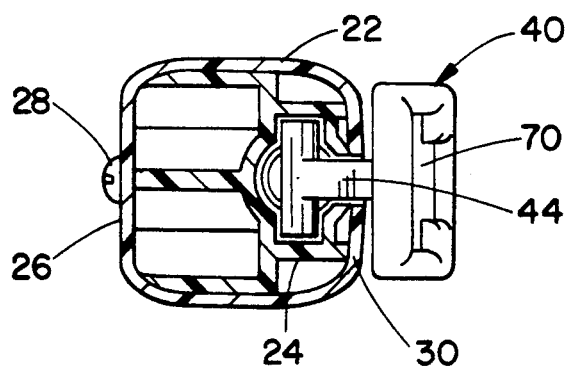
FIG. 6 is a cross-sectional view of FIG. 5 along line 6—6.

With reference again to FIG. 3, the guide 40 includes a substantially rectangular body portion 42 and an extension 44 that protrudes rearwardly therefrom. The extension 44, which is substantially perpendicular to the body 42 includes a first section 46 and a second section 48. The two sections 46, 48 are perpendicular in relationship to each other so as to define a T-shaped extension. As is evident from FIG. 6, the housing cavity 36 is so shaped as to accept the T-shaped extension therein and prevent the removal of the extension therefrom.

With reference now to FIG. 5, positioned in the cavity 36 of the housing 24 is a spring 52 having a lower end 54 which sits on a base 56 of the cavity. The spring lower end 54 is held in place by a rib 58 that protrudes into the cavity 36 from a side wall of the housing 24 and extends over a first loop of the spring at its lower end 54. The spring also has an upper end 60 which contacts a bottom face of the T-shaped extension 44 of the guide 40.

Provided on a front wall of the guide 40 is a slot 70. As best seen in FIG. 3, the slot is somewhat T-shaped and is defined by a pair of spaced shortened front walls 72 and 74.

With reference now to FIG. 2, a bag clip 80 is adapted to cooperate with the guide 40. The bag clip 80 includes first and second jaws 82 and 84 and a central portion 86. Protruding from the central portion 86 is an extension 87 which comprises a first section 88 and a second section 90. The second section 90 is oriented transverse to the first section 88 so that the two sections form a somewhat T-shaped extension. The bag clip extension 87 is so sized as to fit within the slot 70 formed in the guide 40 as can be seen in FIGS. 1 and 5.

As shown in FIG. 5, the two jaws 82 and 84 clamp an upper end 98 of an outer or cloth bag 100. With reference now again to FIG. 4, the cloth bag 100 also has a lower end 102 which is held, and preferably permanently mounted, in a lower bag support 104 that is affixed to the lower tubular portion 12 of the handle 10. As best shown in FIG. 5, the plate 20 is fastened over a portion of the cloth bag 100 so as to secure the upper end of the cloth bag to the handle 10. Disposed within the outer or cloth bag 100 is an inner filter bag 110, preferably made of paper. This bag has, fastened to its upper end, a collar 112 with an aperture 114 extending therethrough. As is well known, the collar is preferably made from a stiff non-porous cardboard material. The aperture 114 is so sized as to fit over the outlet end 16 of the duct 14. As shown in FIG. 5, the outlet 16 of the duct includes a ridge 116 on its outer periphery. When the collar 112 is pushed past the ridge, the aperture 114 is so sized in the collar 112 as to retain the collar on the far side of the ridge until the bag 110 is positively pulled away from the outlet 16.

As is conventional, the entire handle 10 is supported in a pivotable fashion on a base unit. With reference again to FIG. 4, a base unit 120 includes wheels 122 and a rotating brush 124. Located within the base unit 120 is a vacuum pump 126 which draws a vacuum on an inlet nozzle adjacent the rotating brush 124 and allows the air sucked in at the inlet nozzle to be transported to the inlet of the duct 14. Although the vacuum pump 126 is shown as being located in the base unit 120, it should be recognized that this pump could also be located on the handle if that were suitably configured.

In use, the extension 44 of the guide 40 is inserted in the cavity 36 formed in the housing 24 that is held within the lower tubular portion 12 of the handle 10, preferably during the manufacture of the vacuum cleaner. A suitable paper bag 110 is placed within the cloth bag 100. Thereafter, the extension 87 of the bag clip 80 is inserted in the slot 70 of the guide 40. When the outer bag 100, and hence the entire assembly, is stretched it is difficult to open the outer bag 100 in order to replace the disposable inner filter bag 110. Accordingly, when the paper bag 110 is full, the user needs to relieve the resilient force on the outer bag 100. This is done by removing the extension 87 of the bag clip 80 from the slot 70 in the guide 40. This will allow the spring 52 to push the guide extension 44 upward. However, the upward tension on the outer bag 100 is now alleviated and the outer bag 100 can be readily opened to allow a replacement of the inner filter bag 110 with a clean bag. As is well known, the outer or cloth bag 100 can be opened by way of a zipper 130 or the like, as is shown in FIG. 4, in order to allow access to the inner or paper bag 110. Once a clean bag is in place, the outer bag 100 can again be closed and the bag clip extension 87 can again be inserted into the slot 70 in the guide 40.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

Having thus described the preferred embodiment, the invention is claimed as follows:

1. A bag securing and tensioning system for a vacuum cleaner, comprising:
   a duct means for directing a flow of dirt laden air from an inlet end thereof to an outlet end thereof;
   a porous outer bag; and,
   a connection means for releasably mounting said outer bag to said outlet end of said duct means, said connection means comprising:
      a longitudinally extending slot located in a handle of the vacuum cleaner,
      a bag guide member including an extension slidably mounted in said slot, and
      a bag clip secured to said bag guide member, said bag clip holding an end of said porous outer bag.

2. The system of claim 1 further comprising a porous filter bag enclosed by said porous outer bag.

3. The system of claim 1 further comprising a lower bag support member for holding a lower end of said outer bag.

4. The system of claim 1 wherein said connection means further comprises a means for biasing said bag guide member which is slidably mounted in said slot in one direction in relation to said duct means inlet end.

5. The system of claim 4 wherein said means for biasing comprises a spring located in a cavity communicating with said slot.

6. The system of claim 1 wherein said bag clip comprises:
   a T-shaped extension selectively mounted in a slot extending in said bag guide member along a longitudinal axis thereof; and,
   a pair of jaws which hold said end of said porous outer bag.

7. The system of claim 1 wherein said bag guide member extension is T-shaped and said bag guide member further comprises a substantially rectangular body having a longitudinally extending slot.

8. A vacuum cleaner, comprising: a floor engaging unit;
   a handle assembly pivotally mounted on said floor engaging unit, said handle assembly including a duct through which dirt laden air is conducted;
   a vacuum pump means located in one of said floor engaging unit and said handle assembly for urging dirt laden air through said duct;
   a porous filter bag;
   a connection means for mounting said porous filter bag to an outlet end of said duct;
   a porous outer bag enclosing said filter bag;
   a lower bag support member, secured to said handle assembly, for holding a lower end of said outer bag;
   an upper bag support assembly for holding an upper end of said outer bag, wherein said upper bag support assembly comprises:
      a longitudinally extending slot located in said handle assembly,
      a bag guide member including an extension slidably mounted in said slot, and
      a bag clip secured to said bag guide member, said bag clip holding an end of said porous outer bag.

9. The vacuum cleaner of claim 8 wherein said bag clip comprises:
   a T-shaped extension selectively mountable in a slot extending in said bag guide member; and,
   a pair of jaws which hold said upper end of said porous bag.

10. The vacuum cleaner of claim 8 further comprising a biasing means for biasing said guide member in one direction in relation to said handle assembly.

11. The vacuum cleaner of claim 8 wherein said bag guide member extension is T-shaped and said bag guide member further comprises an a substantially rectangular body having a longitudinally extending slot in which an extension of said bag clip can be mounted.

12. A bag support system for a vacuum cleaner, comprising:
   a handle member including a duct having an inlet end and an outlet end spaced from said inlet end;
   a porous outer bag; and,
   a connection means for releasably mounting said outer bag to said handle member duct outlet end, said connection means comprising:
      a longitudinally extending slot located in said handle member,
      a bag guide member including an extension slidably mounted in said slot, and
      a bag clip secured to said bag guide member, said bag clip holding an end of said porous outer bag.

13. The system of claim 12 further comprising a porous filter bag enclosed by said outer bag.

14. The system of claim 13 wherein said outer bag further comprises a selectively openable closure for obtaining access to said filter bag.

15. The system of claim 12 further comprising a means for biasing said guide member in one direction in relation to said handle member.

16. The system of claim 12 wherein said bag guide member extension is T-shaped and said bag guide member further comprises a substantially rectangular body having a longitudinally extending slot.

17. The system of claim 12 wherein said bag clip comprises:
   a T-shaped extension selectively mountable in a slot extending in said bag guide member; and, a pair of jaws which hold said upper end of said porous bag.

18. The system of claim 12 further comprising a lower bag support member, secured to said handle member, for holding a lower end of said outer bag.

19. The system of claim 18 wherein said outer bag is permanently secured to said lower bag support member.

20. The system of claim 12 wherein said bag guide extension is oriented substantially perpendicular to a main body of said bag guide.

* * * * *